US012574916B2

(12) United States Patent
Huang et al.

(10) Patent No.: US 12,574,916 B2
(45) Date of Patent: Mar. 10, 2026

(54) SRS ENHANCEMENTS FOR RADAR COEXISTENCE

(71) Applicant: InterDigital Patent Holdings, Inc., Wilmington, DE (US)

(72) Inventors: Joe Huang, Montville, NJ (US); Sudhir Pattar, Mount Laurel, NJ (US); Philip Pietraski, Jericho, NY (US); Tariq Elkourdi, Belleville, NJ (US); Jane Mack, Melville, NY (US); Phillip Leithead, King of Prussia, PA (US); Daniel Steinbach, Commack, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 361 days.

(21) Appl. No.: 18/309,620

(22) Filed: Apr. 28, 2023

(65) Prior Publication Data

US 2024/0137926 A1     Apr. 25, 2024

Related U.S. Application Data

(60) Provisional application No. 63/336,893, filed on Apr. 29, 2022.

(51) Int. Cl.
| | |
|---|---|
| *H04W 4/00* | (2018.01) |
| *H04L 1/1607* | (2023.01) |
| *H04L 5/00* | (2006.01) |
| *H04W 72/11* | (2023.01) |

(52) U.S. Cl.
CPC ........... *H04W 72/11* (2023.01); *H04L 1/1614* (2013.01); *H04L 5/0012* (2013.01); *H04L 5/0051* (2013.01)

(58) Field of Classification Search
CPC ..... H04W 72/11; H04L 1/1614; H04L 5/0012
See application file for complete search history.

(56) References Cited

U.S. PATENT DOCUMENTS

| | | | | |
|---|---|---|---|---|
| 11,290,968 B2* | 3/2022 | MolavianJazi | ....... | H04L 1/1858 |
| 2012/0257519 A1* | 10/2012 | Frank | ...................... | H04L 5/143 |
| | | | | 370/252 |
| 2024/0031875 A1* | 1/2024 | Wei | ........................ | H04W 72/23 |

OTHER PUBLICATIONS

Ahmadi, *5G NR Architecture, Technology, Implementation, and Operation of 3GPP New Radio Standards,* Academic Press (2019).
Dahlman et al., *5G NR The Next Generation Wireless Access Technology,* Academic Press (2021).

(Continued)

*Primary Examiner* — Elisabeth Benoit Magloire
(74) *Attorney, Agent, or Firm* — VOLPE KOENIG

(57) ABSTRACT

Examples for ensuring robust SRS transmission and reception can occur when coexisting with interference include moving WTRU SRS transmissions out of the interference band to mitigate interference to and from the interferer, increasing the number of OFDM symbols and/or the repetition factor for SRS to overcome the interference, dynamic switching/suspending of semi-persistent SRS and/or aperiodic SRS to mitigate interference to and from the interferer, and power boosting of SRS transmissions to overcome the interference.

19 Claims, 9 Drawing Sheets

300 ⟍

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Third Generation Partnership Project, "Technical Specification Group Radio Access Network; NR; Physical layer procedures for control (Release 17)," 3GPP TS 38.213 V17.1.0 (Mar. 2022).

Third Generation Partnership Project, "Technical Specification Group Radio Access Network; NR; Physical layer procedures for control (Release 17)," 3GPP TS 38.213 V17.5.0 (Mar. 2023).

Third Generation Partnership Project, "Technical Specification Group Radio Access Network; NR; Physical layer procedures for control (Release 16)," 3GPP TS 38.213 V16.9.0 (Mar. 2022).

Third Generation Partnership Project, "Technical Specification Group Radio Access Network; NR; Radio Resource Control (RRC) protocol specification (Release 17)," 3GPP TS 38.331 V17.4.0 (Mar. 2023).

Third Generation Partnership Project, "Technical Specification Group Radio Access Network; NR; Radio Resource Control (RRC) protocol specification (Release 17)," 3GPP TS 38.331 V17.0.0 (Mar. 2022).

Third Generation Partnership Project, "Technical Specification Group Radio Access Network; NR; Radio Resource Control (RRC) protocol specification (Release 16)," 3GPP TS 38.331 V16.7.0 (Dec. 2021).

Third Generation Partnership Project, "Technical Specification Group Radio Access Network; NR; Multiplexing and channel coding (Release 17)," 3GPP TS 38.212 V17.5.0 (Mar. 2023).

Third Generation Partnership Project, "Technical Specification Group Radio Access Network; NR; Multiplexing and channel coding (Release 17)," 3GPP TS 38.212 V17.1.0 (Mar. 2022).

Third Generation Partnership Project, "Technical Specification Group Radio Access Network; NR; Multiplexing and channel coding (Release 16)," 3GPP TS 38.212 V16.9.0 (Mar. 2022).

Third Generation Partnership Project, "Technical Specification Group Radio Access Network; NR; Physical layer procedures for data (Release 17)," 3GPP TS 38.214 V17.5.0 (Mar. 2023).

Third Generation Partnership Project, "Technical Specification Group Radio Access Network; NR; Physical layer procedures for data (Release 17)," 3GPP TS 38.214 V17.1.0 (Mar. 2022).

Third Generation Partnership Project, "Technical Specification Group Radio Access Network; NR; Physical layer procedures for data (Release 16)," 3GPP TS 38.214 V16.9.0 (Mar. 2022).

* cited by examiner

Determine Interferer Characteristics — 310

Determine the set of WTRUs that Incur Significant Interference from the Interferer on the SRS Transmission Bandwidth — 320

Determine the New SRS Configuration Location in Frequency and Reconfigure the Settings via Higher Layer RRC or L1/L2 Signaling for the Selected WTRUs — 330

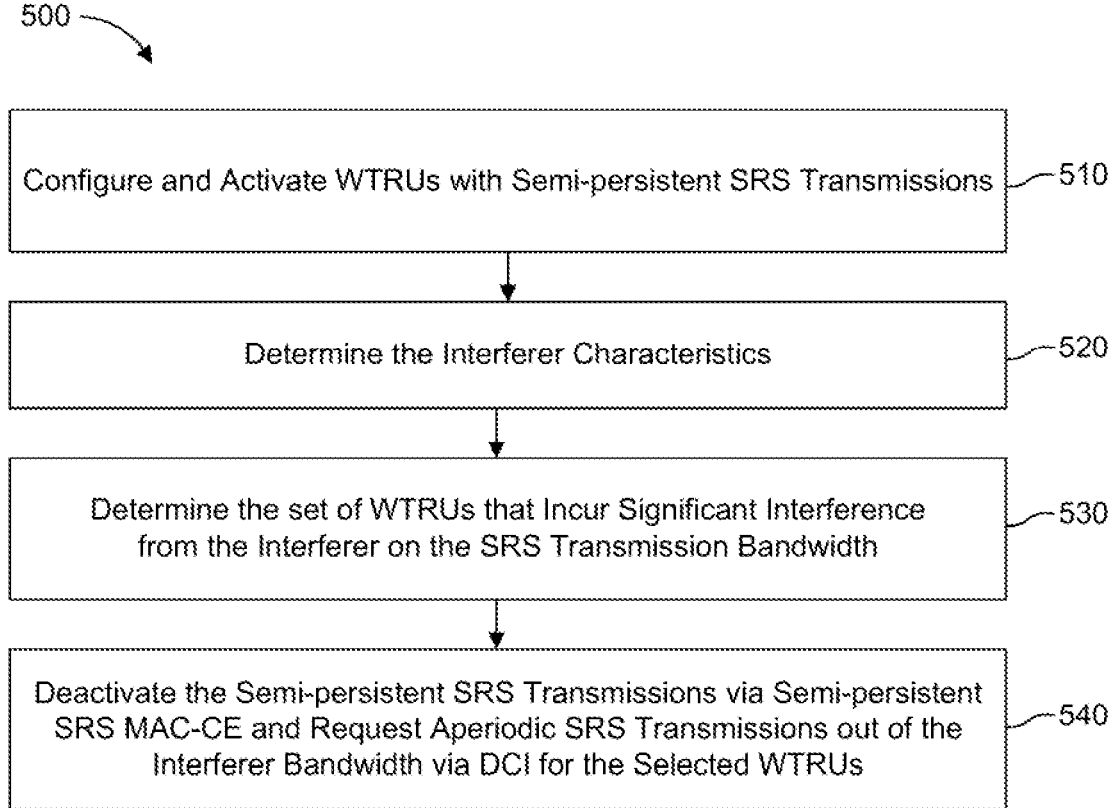

500

Configure and Activate WTRUs with Semi-persistent SRS Transmissions —510

Determine the Interferer Characteristics —520

Determine the set of WTRUs that Incur Significant Interference from the Interferer on the SRS Transmission Bandwidth —530

Deactivate the Semi-persistent SRS Transmissions via Semi-persistent SRS MAC-CE and Request Aperiodic SRS Transmissions out of the Interferer Bandwidth via DCI for the Selected WTRUs —540

FIG. 5

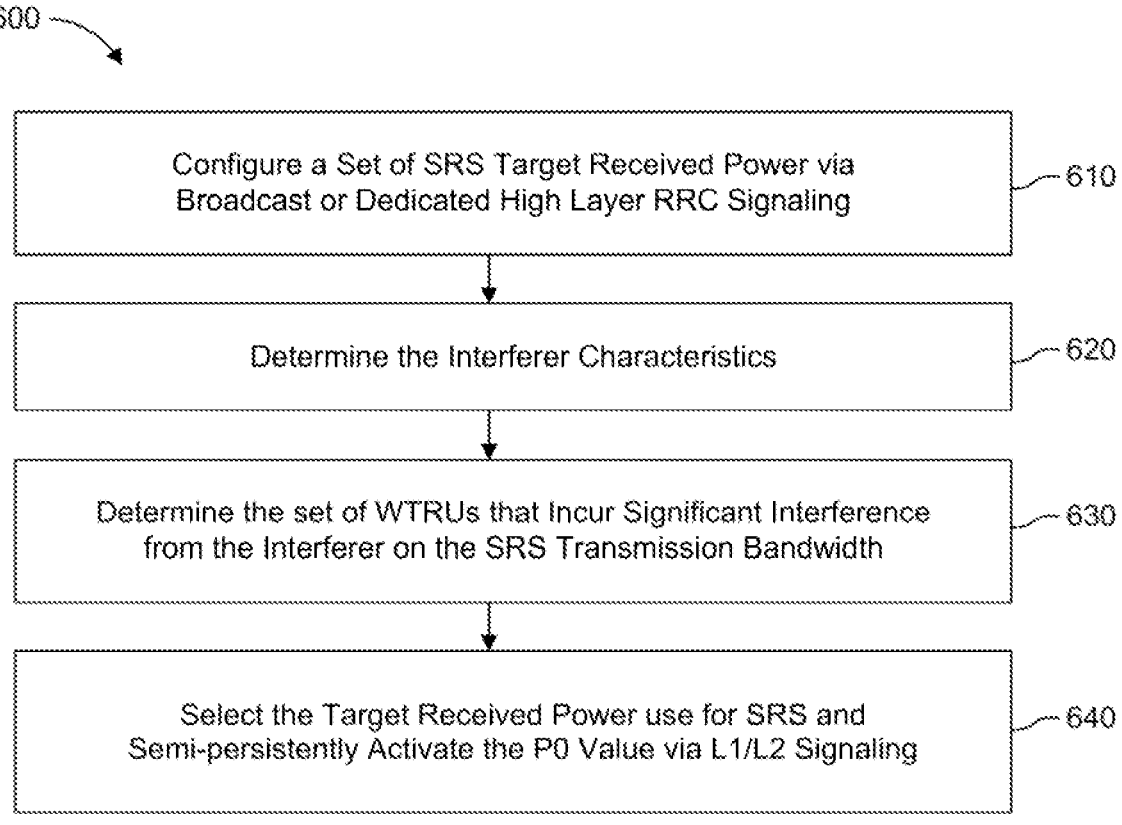

600

Configure a Set of SRS Target Received Power via
Broadcast or Dedicated High Layer RRC Signaling — 610

Determine the Interferer Characteristics — 620

Determine the set of WTRUs that Incur Significant Interference
from the Interferer on the SRS Transmission Bandwidth — 630

Select the Target Received Power use for SRS and
Semi-persistently Activate the P0 Value via L1/L2 Signaling — 640

FIG. 6

SRS ENHANCEMENTS FOR RADAR COEXISTENCE

CROSS-REFERENCE TO RELATED APPLICATIONS

This application claims the benefit of U.S. Provisional Application No. 63/336,893 filed Apr. 29, 2022, which is incorporated by reference as if fully set forth.

STATEMENT OF GOVERNMENT RIGHTS

This invention was made with government support under project NSC-20-2084: Dynamic Spectrum Sharing 5G networks enhancement prototype, also known as ENhanced SecURity and co-Existence for DoD-5G (ENSURED-5G); OTA Number W15QKN-15-9-1004, Base and Project Agreement 2017-314A-Mod-03, Subcontract 2021-01. The government has certain rights in the invention.

BACKGROUND

Recent trends are driving researchers to create solutions for cellular network deployments in the presence of high-power narrowband systems, such as Radio Detection and Ranging (RADAR). Although the baseline functionality provided by 5th Generation (5G) systems could be used to provide some level of coexistence with such systems, enhancements will be required to realize the full 5G potential and to mitigate interference to/from the high-power narrowband system.

To enable uplink channel sounding, a device can be configured for transmission of sounding reference signal (SRS). SRS can be seen as the uplink equivalent of the downlink Channel State Information Reference Signal (CSI-RS). Both CSI-RS and SRS can also serve as Quasi-Collocation (QCL) references in the sense that other physical channels can be configured to be transmitted quasi-co-located with CSI-RS and SRS, respectively. Thus, given the knowledge of a suitable receiver beam for the CSI-RS/SRS, the receiver knows that the same receiver beam should be suitable also for the physical channel in question.

When a narrow-band high power interferer, such as RADAR, operates in a band that overlaps with the resource blocks (RBs) used by a WTRU to transmit sounding reference signal (SRS), the Next Generation (5G) NodeB (gNB) may not be able to reliably perform uplink channel estimation for link adaptation, codebook-based and non-codebook-based uplink (UL) Multiple Input Multiple Output (MIMO) operation, non-codebook-based downlink (DL) MIMO operation, beam based power control, and beam management when the UL-DL correspondence assumption does not hold. For scenarios where the SRS can be received reliably in the presence of interference, there is the potential for the SRS transmission to interfere with the RADAR system, which is also problematic.

SUMMARY

Examples for ensuring robust SRS transmission and reception can occur when coexisting with interference include moving WTRU SRS transmissions out of the interference band to mitigate interference to and from the interferer, increasing the number of OFDM symbols and/or the repetition factor for SRS to overcome the interference, dynamic switching/suspending of semi-persistent SRS and/ or aperiodic SRS to mitigate interference to and from the interferer, and power boosting of SRS transmissions to overcome the interference.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 5 illustrates a method of dynamic switching/suspending of semi-persistent SRS and/or aperiodic SRS to mitigate interference to and from an interferer; and FIG. 6 illustrates a method to power boost SRS transmission to overcome interference.

DETAILED DESCRIPTION

Figure 1A:
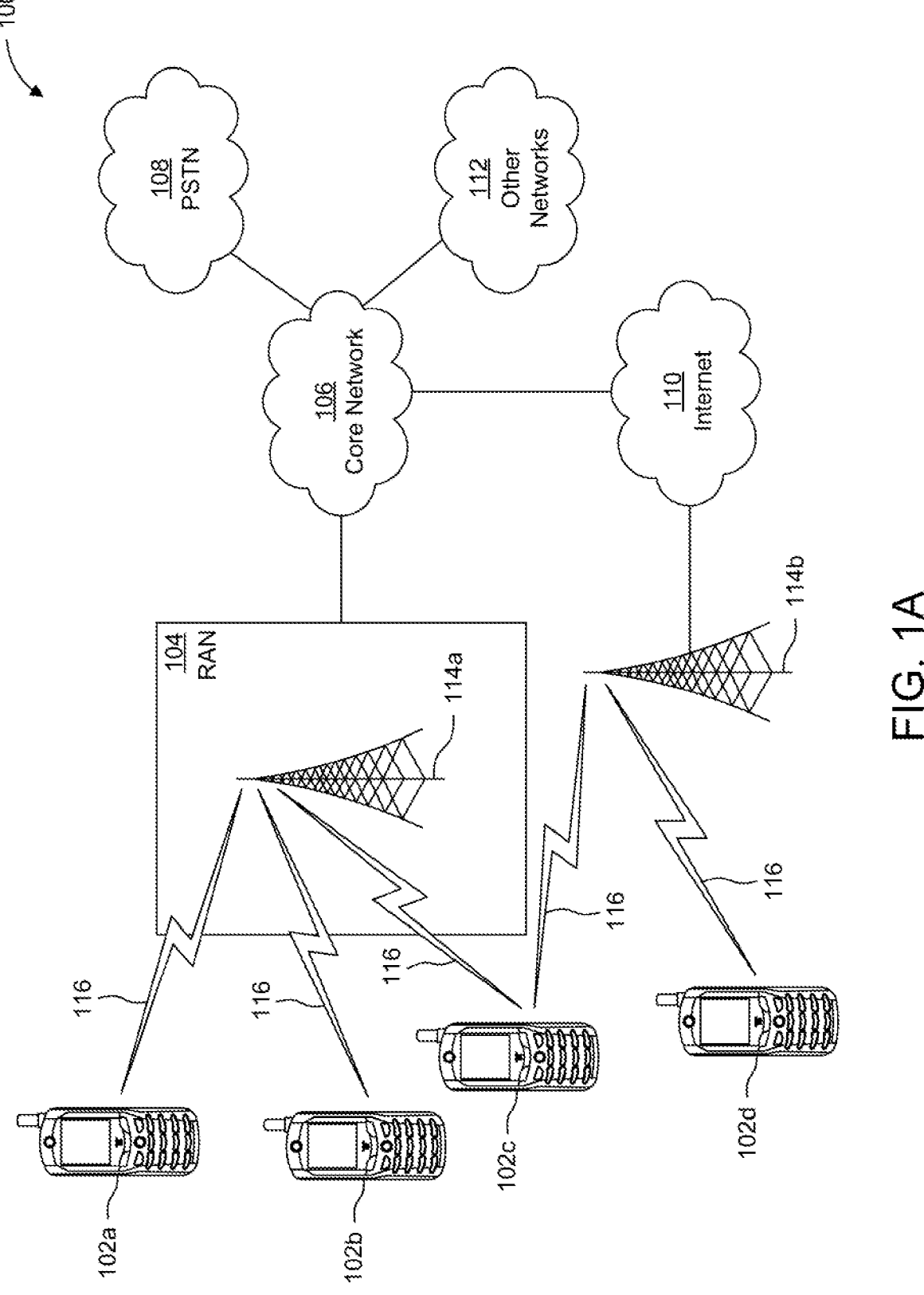
FIG. 1A is a system diagram illustrating an example communications system in which one or more disclosed embodiments may be implemented.

When coexisting with high-power narrowband interferers, such as a Radio Detection and Ranging (RADAR), there is a need for new mechanisms to mitigate interference to/from the high-power narrowband interferer for sounding reference signal (SRS) transmissions. When a narrow-band high power interferer, such as RADAR, operates in a band that overlaps with the resource blocks (RBs) used by the WTRU to transmit SRS, the gNB may not be able to reliably perform uplink (UL) channel estimation for link adaption, codebook-based and non-codebook-based UL MIMO operation, noon-codebook-based downlink (DL) MIMO operation, beam based power control, and beam management when the UL-DL correspondence assumption does not hold. For scenarios where the SRS can be received reliably in the presence of the interference, there is the potential for the SRS transmission to interfere with the RADAR system. Examples of mechanisms for ensuring robust SRS transmission and reception can occur when coexisting with interference include moving WTRU SRS transmissions out of the interference band to mitigate interference to and from the interferer, increasing the number of Orthogonal Frequency Division Multiplexing (OFDM) symbols and/or the repetition factor for SRS to overcome the interference, dynamic switching/suspending of semi-persistent SRS and/or aperiodic SRS to mitigate interference to and from the interferer, and power boosting of SRS transmissions to overcome the interference.

A system and method are provided. The system and method may be performed in a network node for providing semi-persistent (SP) sounding reference signals (SRS) resource modification. The system and method may include determining a set of characteristics of an interferer, determining a set of wireless transmit and receive units (WTRUs) that incur interference from the interferer on a sounding reference signal (SRS) transmission bandwidth, the determination based on the determined set of characteristics of the interferer, and transmitting a SRS suspension bitmap and frequency hopping resource suspension range in a semi-persistent signaling. The interferer may be radar. The system and method may include the SRS resource suspension bitmap is configured to indicate a suspension status of SRS resources. The system and method may include at least one bit in the bitmap represents an SRS resource from an SRS resource set. The system and method may include a value in the bitmap is configured to correspond to the SRS resource and indicates if the resource is to be suspended or transmitted. The system and method may include a value of zero indicates transmission. The system and method may include a value of one indicates suspension. The system and method may include the frequency hopping resource suspension range is configured to indicate a RB range of the SRS resource suspension for frequency hopped SRS resources. The system and method may include the RB range is specified using a resource indication value (RIV).

The system and method may be performed in a wireless transmit and receive unit (WTRU) for providing semi-persistent (SP) sounding reference signals (SRS) resource modification responsive to at least one interferer. The system and method may include receiving a activation/deactivation command of a configured semi-persistent sounding reference signal (SRS) resource set, the activation/deactivation command including a resource suspension bitmap and a frequency hopping resource suspension range, transmitting the SRS resources based on the resource suspension bitmap, suspending a transmission of non-frequency hopped SRS resources indicated as suspend in the resource suspension bitmap, and suspending a transmission of frequency-hopped SRS resources with suspension bits set to be suspended during the hop when at least a portion of an SRS resource bandwidth falls in the frequency hopping resource suspension range. The system and method may include an activation/deactivation field of the received semi-persistent SRS activation/deactivation command is set to 1. The system and method may include suspension bits set to be transmitted are zero. The system and method may include suspension bits set to be suspended are one. The system and method may include the at least one interferer comprises radar. The system and method may include the resource suspension bitmap is configured to indicate a suspension status of SRS resources. The system and method may include the resource suspension bitmap includes at least one bit that represents an SRS resource from an SRS resource set. The system and method may include a value in the bitmap is configured to correspond to the SRS resource and indicates if the resource is to be suspended or transmitted. The system and method may include a frequency hopping resource suspension range configured to indicate a RB range of the SRS resource suspension for frequency-hopped SRS resources to identify if at least a portion of an SRS resource bandwidth of a hop falls in the frequency hopping resource suspension range.

The system and method may include the RB range is specified using a resource indication value (RIV).

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA-F). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
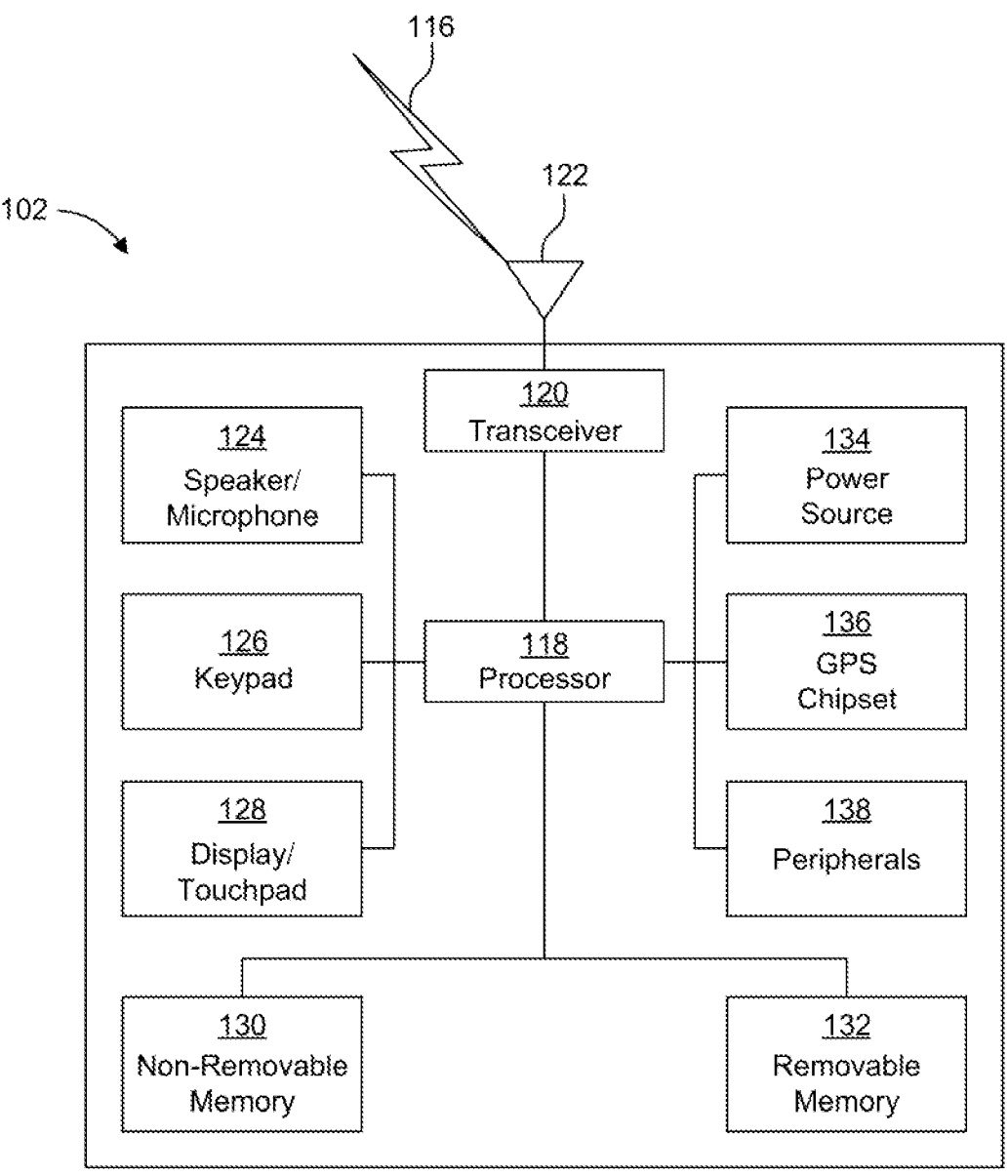
FIG. 1B is a system diagram illustrating an example wireless transmit/receive unit (WTRU) that may be used within the communications system illustrated in FIG. 1A according to an embodiment.
Figure 1C:
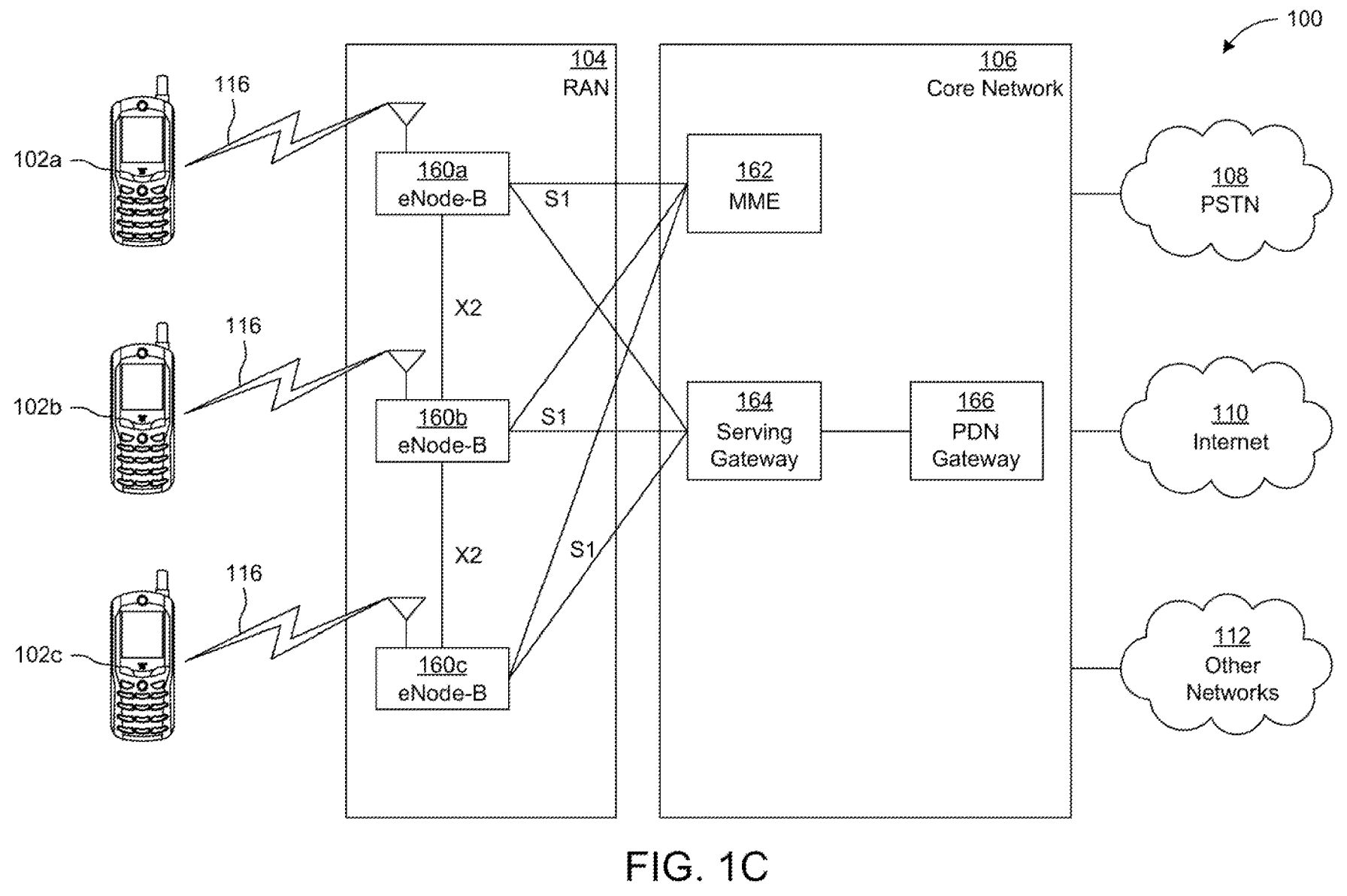

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the uplink (UL) (e.g., for transmission) and downlink (DL) (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MI MO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
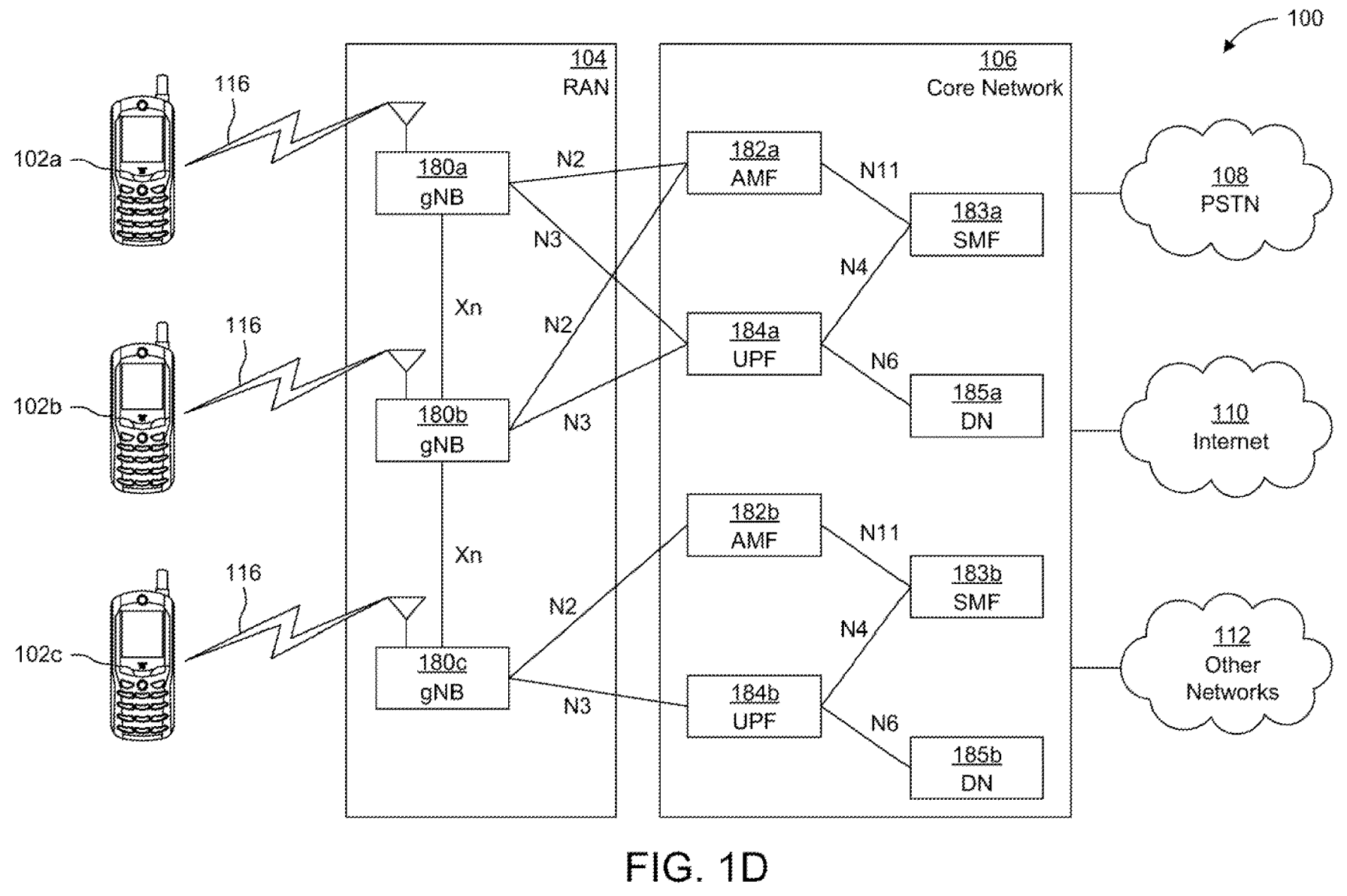

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-Third Generation Partnership Project (3GPP) access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A sounding reference signal (SRS) may span one, two, or four consecutive OFDM symbols and may be located somewhere within the last six symbols of a slot. In the frequency domain, an SRS has a so-called comb structure, implying that an SRS is transmitted on every Nth subcarrier where N can the values of 2 or 4 ("comb-2" and "comb-4," respectively). The SRS transmissions from different devices may be frequency multiplexed within the same frequency range by being assigned different combs corresponding to different frequency offsets. For comb-2 (i.e., SRS is transmitted on every second subcarrier), two SRS can be frequency multiplexed. In the case of comb-4, up to four SRS can be frequency multiplexed.

An SRS resource may be configured by the SRS-Resource IE and may include 1, 2, or 4 antenna ports, where the number of antenna ports is set by the higher layer parameter nrofSRS-Ports, and the number of consecutive OFDM symbols provided via nrofSymbols contained in the higher layer parameter resourceMapping. In the case of an SRS supporting more than one antenna port, the different ports share the same set of resource elements and the same basic SRS sequence. Different phase rotations may applied to separate the different ports. The Radio Resource Control (RRC) parameters freqDomainShift and freqDomainPosition may be used to position the SRS in the frequency grid.

There is a tradeoff between coverage and SRS transmission bandwidth. Since the total power of a WTRU is limited, one way to improve SRS coverage is to configure the WTRU to transmit SRS over a small bandwidth. Given a fixed transmit power, the power density of the SRS transmission is increased and thus SRS coverage improves. The drawback is that only a part of the bandwidth is sounded. To this end, SRS frequency hopping, where SRS transmissions at different times occupy different parts of the Bandwidth Part (BWP) may be utilized. The part of the BWP that is used for SRS transmission in a given OFDM symbol is pseudo-randomly determined. All parts of the total configured SRS bandwidth are sounded before the randomizations restart with the first part again. Both intra-slot hopping and inter-slot hopping (or a combination of both) are supported.

An SRS can be configured for periodic, semi-persistent, or aperiodic transmissions. A periodic SRS is transmitted with a certain configured periodicity and a certain configured slot offset within that periodicity. A semi-persistent SRS has a configured periodicity and slot offset in the same way as a periodic SRS. Actual SRS transmission according to the configured periodicity is activated via MAC Control Element (MAC-CE) signaling. An aperiodic SRS is only transmitted when explicitly triggered by downlink control information (DCI).

The SRS-Config IE may be used to configure SRS transmissions. The configuration defines a list of SRS-Resources and a list of SRS-ResourceSets. Each resource set defines a set of SRS-Resources. A device may be configured with multiple SRS resource sets that can be used for different purposes, including both downlink and uplink multi-antenna precoding and downlink and uplink beam management. SRS included within a configured SRS resource set may be the same type. In other words, periodic, semi-periodic or aperiodic transmission is a property of an SRS resource set. Activation/deactivation of semi-persistent or triggering of aperiodic SRS is not done for a specified SRS but is done for an SRS resource set.

The network may activate and deactivate the configured SP (semi-persistent) SRS resource sets of a Serving Cell by sending the SP SRS Activation/Deactivation MAC CE. The configured SP SRS resource sets are initially deactivated upon configuration and after a handover. The SP SRS Activation/Deactivation MAC CE is identified by a MAC subheader with LCID. SP SRS Activation/Deactivation MAC CE has a variable size with the fields set forth in Table 1.

220 represents the field configured to indicate a UL BWP as the codepoint of the DCI bandwidth part indicator field, which contains activated/deactivated SP SRS Resource Set. C 225 represents the field configured to indicate whether the octets containing Resource Serving Cell ID field(s) and Resource BWP ID field(s) are present. SUL 230 represents the field configured to indicate whether the MAC CE applies to the NUL carrier or SUL carrier configuration. SP SRS Resource Set ID 235 represents the field configured to indicate the SP SRS Resource Set ID identified by SRS-ResourceSetId, which is to be activated or deactivated. Fi 240 represents the field configured to indicate the type of a resource used as a spatial relationship for SRS resource within SP SRS Resource Set indicated with SP SRS

TABLE 1

| SP SRS Activation/Deactivation MAC CE Fields | |
| --- | --- |
| A/D | This field indicates whether to activate or deactivate indicated SP SRS resource set. The field is set to 1 to indicate activation, otherwise it indicates deactivation |
| SRS Resource Set's Cell ID | This field indicates the identity of the Serving Cell, which contains activated/deactivated SP SRS Resource Set. If the C field is set to 0, this field also indicates the identity of the Serving Cell which contains all resources indicated by the Resource IDi fields. The length of the field is 5 bits |
| SRS Resource Set's BWP ID | This field indicates a UL BWP as the codepoint of the DCI bandwidth part indicator field, which contains activated/deactivated SP SRS Resource Set. If the C field is set to 0, this field also indicates the identity of the BWP which contains all resources indicated by the Resource IDi fields. The length of the field is 2 bits |
| C | This field indicates whether the octets containing Resource Serving Cell ID field(s) and Resource BWP ID field(s) are present. If this field is set to 1, the octets containing Resource Serving Cell ID field(s) and Resource BWP ID field(s) are present, otherwise they are not present |
| SUL | This field indicates whether the MAC CE applies to the NUL carrier or SUL carrier configuration. This field is set to 1 to indicate that it applies to the SUL carrier configuration, and it is set to 0 to indicate that it applies to the NUL carrier configuration |
| SP SRS Resource Set ID | This field indicates the SP SRS Resource Set ID identified by SRS-ResourceSetId, which is to be activated or deactivated. The length of the field is 4 bits |
| Fi | This field indicates the type of a resource used as a spatial relationship for SRS resource within SP SRS Resource Set indicated with SP SRS Resource Set ID field. F0 refers to the first SRS resource within the resource set, F1 to the second one and so on. The field is set to 1 to indicate NZP CSI-RS resource index is used, and it is set to 0 to indicate either SS/PBCH block (SSB) index or SRS resource index is used. The length of the field is 1 bit. This field is only present if MAC CE is used for activation, i.e. the A/D field is set to 1 |
| Resource IDi | This field contains an identifier of the resource used for spatial relationship derivation for SRS resource i. Resource ID0 refers to the first SRS resource within the resource set, Resource ID1 to the second one and so on. If Fi is set to 0, and the first bit of this field is set to 1, the remainder of this field contains SSB-Index. If Fi is set to 0, and the first bit of this field is set to 0, the remainder of this field contains SRS-ResourceId. The length of the field is 7 bits. This field is only present if MAC CE is used for activation, i.e. the A/D field is set to 1 |
| Resource Serving Cell IDi | This field indicates the identity of the Serving Cell on which the resource used for spatial relationship derivation for SRS resource i is located. The length of the field is 5 bits |
| Resource BWP IDi | This field indicates a UL BWP as the codepoint of the DCI bandwidth part indicator field, on which the resource used for spatial relationship derivation for SRS resource i is located. The length of the field is 2 bits |
| R | Reserved bit, set to 0 |

Figure 2:
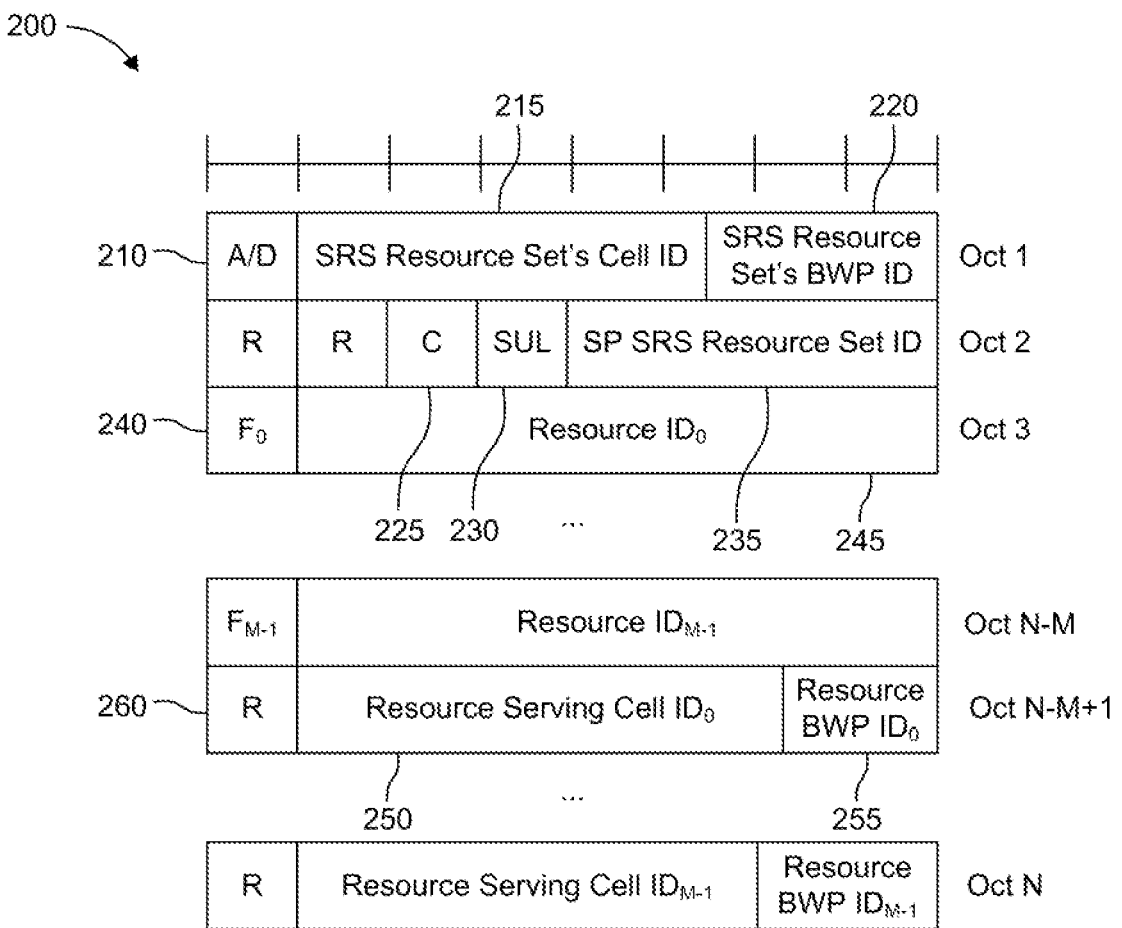
FIG. 2 illustrates a depiction of semi-persistent SRS activation/deactivation MAC CE including the fields of Table 1.

FIG. 2 illustrates a depiction 200 of semi-persistent SRS activation/deactivation MAC CE including the fields of Table 1. As described in Table 1, semi-persistent SRS activation/deactivation MAC CE includes ND 210, SRS Resource Set's Cell ID 215, SRS Resource Set's BWP ID 220, C 225, SUL 230, SP SRS Resource Set ID 235, Fi 240, Resource IDi 245, Resource Serving Cell IDi 250, Resource BWP IDi 255, and R 260. The fields, as depicted in FIG. 2, may be arranged in the semi-persistent SRS activation/deactivation MAC CE.

ND 210 represents the field configured to whether to activate or deactivate indicated SP SRS resource set. SRS Resource Set's Cell ID 215 represents the field configured to identify the Serving Cell, which contains activated/deactivated SP SRS Resource Set. SRS Resource Set's BWP ID Resource Set ID field, where F0 refers to the first SRS resource within the resource set, F1 to the second one and so on. Resource IDi 245 represents the field that contains an identifier of the resource used for spatial relationship derivation for SRS resource i. Resource ID0 refers to the first SRS resource within the resource set, Resource ID1 to the second one and so on. Resource Serving Cell IDi 250 represents the field configured to indicate the identity of the Serving Cell on which the resource used for spatial relationship derivation for SRS resource i is located. Resource BWP IDi 255 represents the field configured to indicate a UL BWP as the codepoint of the DCI bandwidth part indicator field, on which the resource used for spatial relationship derivation for SRS resource i is located. R 260 represents the field configured to provide a reserved bit.

The transmission of aperiodic SRS (or more accurately, transmission of the set of configured SRS included in an aperiodic SRS resource set) is triggered by DCI. DCI format 0_1 (uplink scheduling grant) and DCI format 1_1 (downlink scheduling assignment) include a 2-bit SRS-request that may trigger the transmission of one out of three different aperiodic SRS resource sets using a configured aperiodicSRS-ResourceTrigger for the device (the fourth bit combination corresponds to "no triggering"), as shown in Table 2.

instant, but the SRS resources in different SRS resource sets with the same time domain behavior in the same BWP may be transmitted simultaneously.

For aperiodic SRS at least one state of the DCI field is used to select at least one out of the configured SRS resource set(s). The following SRS parameters in Table 3 are semi-statically configurable by higher layer parameter SRS-Resource.

TABLE 3

| SRS Parameters Are Semi-Statically Configurable By Higher Layer Parameter SRS-Resource | |
| --- | --- |
| SRS-ResourceId | determines SRS resource configuration identity. |
| Number of SRS ports | as defined by the higher layer parameter nrofSRS-Ports. If not configured, nrofSRS-Ports is 1. |
| Time domain behavior of SRS resource configuration | as indicated by the higher layer parameter resourceType, which may be periodic, semi-persistent, aperiodic SRS transmission. |
| Slot level periodicity and slot level offset | as defined by the higher layer parameters periodicityAndOffset-p or periodicityAndOffset-sp for an SRS resource of type periodic or semi-persistent. The WTRU is not expected to be configured with SRS resources in the same SRS resource set SRS-ResourceSet with different slot level periodicities. For an SRS-ResourceSet configured with higher layer parameter resourceType set to 'aperiodic', a slot level offset is defined by the higher layer parameter slotOffset. |
| Number of OFDM symbols in the SRS resource | starting OFDM symbol of the SRS resource within a slot including repetition factor R as defined by the higher layer parameter resourceMapping. If R is not configured, then R is equal to the number of OFDM symbols in the SRS resource. |
| SRS bandwidth $B_{SRS}$ and $C_{SRS}$ | as defined by the higher layer parameter freqHopping. If not configured, then $B_{SRS} = 0$. |
| Frequency hopping bandwidth $b_{hop}$ | as defined by the higher layer parameter freqHopping. If not configured, then $b_{hop} = 0$. |
| Defining frequency domain position and configurable shift | as defined by the higher layer parameters freqDomainPosition and freqDomainShift, respectively. If freqDomainPosition is not configured, freqDomainPosition is zero. |
| Cyclic shift | as defined by the higher layer parameter cyclicShift-n2, cyclicShift-n4, or cyclicShift-n8 for transmission comb value 2, 4 or 8. |
| Transmission comb value | as defined by the higher layer parameter transmissionComb. |
| Transmission comb offset | as defined by the higher layer parameter combOffset-n2, combOffset-n4, and combOffset-n8 for transmission comb value 2, 4, or 8. |
| SRS sequence ID | as defined by the higher layer parameter sequenceId. |

TABLE 2

| SRS Request To Trigger Aperiodic SRS Transmission | |
| --- | --- |
| Value of SRS request field | Triggered aperiodic SRS resource set(s) |
| 00 | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 |
| 10 | SRS resource set(s) configured by SRS-ResourceSet with higher layer parameter aperiodicSRS-ResourceTrigger set to 2 or an entry in aperiodicSRS-ResourceTriggerList set to 2 |
| 11 | SRS resource set(s) configured by SRS-ResourceSet with higher layer parameter aperiodicSRS-ResourceTrigger set to 3 or an entry in aperiodicSRS-ResourceTriggerList set to 3 |

The WTRU may be configured with one or more Sounding Reference Signal (SRS) resource sets as configured by the higher layer parameter SRS-ResourceSet. For each SRS resource set configured by SRS-ResourceSet, a WTRU may be configured with SRS resources (higher layer parameter SRS-Resource), where the maximum value of K is indicated by WTRU capability. The SRS resource set applicability is configured by the higher layer parameter usage in SRS-ResourceSet. When the higher layer parameter usage is set to 'beamManagement', one SRS resource in each of multiple SRS resource sets may be transmitted at a given time The configuration of the spatial relation between a reference RS and the target SRS, where the higher layer parameter spatialRelationInfo, if configured, contains the ID of the reference RS. The reference RS may be an SS/PBCH block, CSI-RS configured on serving cell indicated by higher layer parameter servingCellId if present, same serving cell as the target SRS otherwise, or an SRS configured on uplink BWP indicated by the higher layer parameter uplinkBWP, and serving cell indicated by the higher layer parameter servingCellId if present, same serving cell as the target SRS otherwise.

The WTRU may be configured by the higher layer parameter resourceMapping in SRS-Resource with an SRS resource occupying N=1, 2, or 4 adjacent OFDM symbols within the last 6 symbols of the slot. If the WTRU has an active semi-persistent SRS resource configuration and has not received a deactivation command, the semi-persistent SRS configuration is considered to be active in the UL BWP which is active, otherwise it is considered suspended.

```
SRS-ResourceSet ::=                            SEQUENCE {
  srs-ResourceSetId                              SRS-ResourceSetId,
  srs-ResourceIdList                             SEQUENCE (SIZE(1..maxNrofSRS-ResourcesPerSet)) OF SRS-ResourceId
  resourceType                                   CHOICE {
    aperiodic                                      SEQUENCE {
      aperiodicSRS-ResourceTrigger                     INTEGER (1..maxNrofSRS-TriggerStates-1),
      csi-RS                                       NZP-CSI-RS-ResourceId
      slotOffset                                   INTEGER (1..32)
      ...,
      [[
      aperiodicSRS-ResourceTriggerList                 SEQUENCE (SIZE(1..maxNrofSRS-TriggerStates-2))
                                                   OF INTEGER (1..maxNrofSRS-TriggerStates-1)
      ]]
    },
    semi-persistent                                SEQUENCE {
      associatedCSI-RS                               NZP-CSI-RS-ResourceId
      ...
    },
    periodic                                       SEQUENCE {
      associatedCSI-RS                               NZP-CSI-RS-ResourceId
      ...
    }
  },
  usage                                          ENUMERATED {beamManagement, codebook, nonCodebook, antennaSwitching},
}
SRS-ResourceSetId ::=                          INTEGER (0..maxNrofSRS-ResourceSets-1)
```

```
maxNrofSRS-ResourceSets   INTEGER ::= 16   -- Maximum number of SRS resource sets in a BWP.
maxNrofSRS-Resources                         INTEGER ::= 64          -- Maximum number of
SRS resources.
maxNrofSRS-ResourcesPerSet                    INTEGER ::= 16          -- Maximum number of
SRS resources in an SRS resource set.
```

```
maxNrofSRS-ResourceSets   INTEGER ::= 16   -- Maximum number of SRS resource sets in a BWP.

maxNrofSRS-Resources                         INTEGER ::= 64          -- Maximum number of SRS resources.

maxNrofSRS-ResourcesPerSet                    INTEGER ::= 16          -- Maximum number of SRS resources in an SRS resource set.
```

```
SRS-Resource ::=                            SEQUENCE {
  srs-ResourceId                              SRS-ResourceId,
  nrofSRS-Ports                               ENUMERATED {port1, ports2, ports4},
  ptrs-PortIndex                              ENUMERATED {n0, n1 }               OPTIONAL, -- Need R
  transmissionComb                            CHOICE {
    n2                                        SEQUENCE {
      combOffset-n2                                 INTEGER (0.. 1),
      cyclicShift-n2                                INTEGER (0..7)
    },
    n4                                        SEQUENCE {
      combOffset-n4                                 INTEGER (0..3),
      cyclicShift-n4                                INTEGER (0.. 11)
    }
  },
  resourceMapping                             SEQUENCE {
    startPosition                             INTEGER (0..5),
    nrofSymbols                               ENUMERATED {n1, n2, n4},
    repetitionFactor                          ENUMERATED {n1, n2, n4}
  },
  freqDomainPosition                          INTEGER (0..67),
  freqDomainShift                             INTEGER (0..268),
  freqHopping                                 SEQUENCE {
    c-SRS                                     INTEGER (0..63),
    b-SRS                                     INTEGER (0..3),
    b-hop                                     INTEGER (0..3)
  },
```

-continued

```
groupOrSequenceHopping              ENUMERATED {neither, groupHopping, sequenceHopping},
resource Type                       CHOICE {
    aperiodic                       SEQUENCE {
        ...
    },
    semi-persistent                 SEQUENCE {
        periodicityAndOffset-sp             SRS-PeriodicityAndOffset,
        ...
    },
    periodic                        SEQUENCE {
        periodicityAndOffset-p              SRS-PeriodicityAndOffset,
        ...
    }
},
sequenceId                          INTEGER (0..1023),
spatialRelationInfo                 SRS-SpatialRelationInfo
...,
}
SRS-SpatialRelationInfo ::=         SEQUENCE {
    servingCellId                   ServCellIndex
    referenceSignal                 CHOICE {
        ssb-Index                   SSB-Index,
        csi-RS-Index                    NZP-CSI-RS-ResourceId,
        srs                         SEQUENCE {
            resourceId                  SRS-ResourceId,
            uplinkBWP                   BWP-Id
        }
    }
}
SRS-ResourceId ::=                      INTEGER (0..maxNrofSRS-Resources-1)
SRS-PeriodicityAndOffset ::=            CHOICE {
    sl1                             NULL,
    sl2                             INTEGER(0..1),
    sl4                             INTEGER(0..3),
    sl5                             INTEGER(0..4),
    sl8                             INTEGER(0..7),
    sl10                             INTEGER(0..9),
    sl16                             INTEGER(0..15),
    sl20                             INTEGER(0..19),
    sl32                             INTEGER(0..31),
    sl40                             INTEGER(0..39),
    sl64                             INTEGER(0..63),
    sl80                             INTEGER(0..79),
    sl160                              INTEGER(0..159),
    sl320                              INTEGER(0..319),
    sl640                              INTEGER(0..639),
    sl1280                              INTEGER(0..1279),
```

For SRS Power Control, if a WTRU transmits SRS based on a configuration by SRS-ResourceSet on active UL BWP b of carrier f of serving cell c using SRS power control adjustment state with index 1, the WTRU may determine the SRS transmission power $P_{SRS,b,f,c}(i,q_s,l)$ in SRS transmission occasion i as set forth in Equation 1:

Equation 1

$$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^{\mu} \cdot M_{SRS,b,f,c}(i)) + \alpha_{SRS,b,f,c}(q_s) \cdot PL_{b,f,c}(q_d) + h_{b,f,c}(i, l) \end{array} \right\} [dBm]$$

where, $P_{CMAX,f,c}(i)$ is the WTRU configured maximum output power for carrier f of serving cell C in SRS transmission occasion, $P_{O\_SRS,b,f,c}(q_s)$ is provided by p0 for active UL BWP b of carrier f of serving cell c and SRS resource set $q_s$ provided by SRS-ResourceSet and SRS-ResourceSetId, $M_{SRS,b,f,c}(i)$ is an SRS bandwidth expressed in number of resource blocks for SRS transmission occasion i on active UL BWP b of carrier f of serving cell c and μ is a SCS configuration, $\alpha_{SRS,b,f,c}(q_s)$ is provided by alpha for active UL BWP b of carrier f of serving cell c and SRS resource set $q_s$, $PL_{b,f,c}(q_d)$ is a downlink pathloss estimate in dB calculated by the WTRU using RS resource index $q_d$ for the active DL BWP of serving cell c and SRS resource set $q_s$. The RS resource index $q_d$ is provided by pathloss-ReferenceRS associated with the SRS resource set $q_s$ and is either an ssb-Index providing a SS/PBCH block index or a csi-RS-Index providing a CSI-RS resource index. If the WTRU is provided enablePL-RS-Update-ForPUSCH-SRS, a MAC-CE may provide by SRS- PathlossReferenceRS-Id a corresponding RS resource index $q_d$ for aperiodic or semi-persistent SRS resource set $q_s$.

For the SRS power control adjustment state for active UL BWP b of carrier f of serving cell c and SRS transmission occasion i $h_{b,f,c}(i,l)=f_{b,f,c}(i,l)$, where $f_{b,f,c}(i,l)$ is the current PUSCH power control adjustment state, if srs-PowerControl-AdjustmentStates indicates a same power control adjustment state for SRS transmissions and PUSCH transmissions; or $$h_{b,f,c}(i) = h_{b,f,c}(i - i_0) + \sum_{m=0}^{c(S_i)-1} \delta_{SRS,b,f,c}(m)$$

if the WTRU is not configured for PUSCH transmissions on active UL BWP b of carrier f of serving cell C, or if srs-PowerControlAdjustmentStates indicates separate power control adjustment states between SRS transmissions and PUSCH transmissions, and if tpc-Accumulation is not provided, where The $\delta_{SRS,b,f,c}$ values are given, $\delta_{SRS,b,f,c}(m)$ is jointly coded with other TPC commands in a Physical Downlink Control Channel (PDCCH) with DCI format 2_3, $$\sum_{m=0}^{c(S_i)-1} \delta_{SRS,b,f,c}(m)$$

is a sum of TPC command values in a set $S_i$ of TPC command values with cardinality $C(S_i)$ that the WTRU receives between $K_{SRS}(i-i_0)-1$ symbols before SRS transmission occasion $i-i_0$ and $K_{SRS}(i)$ symbols before SRS transmission occasion i on active UL BWP b of carrier f of serving cell C for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i, if srs-PowerControlAdjustmentStates indicates a same power control adjustment state for SRS transmissions and PUSCH transmissions, the update of the power control adjustment state for SRS transmission occasion i occurs at the beginning of each SRS resource in the SRS resource set $q_s$; otherwise, the update of the power control adjustment state SRS transmission occasion i occurs at the beginning of the first transmitted SRS resource in the SRS resource set $q_s$.

Table 4 provides descriptions for the power control related parameters defined within the SRS-ResourceSet IE as shown above.

TABLE 4

| Descriptions For The Power Control Related Parameters Defined Within The SRS-Resourceset IE | |
| --- | --- |
| alpha | alpha value for SRS power control. When the field is absent the WTRU applies the value 1. |
| p0 | P0 value for SRS power control. The value is in dBm. Only even values (step size 2) are allowed. |
| pathlossReferenceRS | A reference signal (e.g., a CSI-RS config or a SS block) to be used for SRS path loss estimation. |

Examples for ensuring robust SRS transmission and reception can occur when coexisting with interference include moving WTRU SRS transmissions out of the interference band to mitigate interference to and from the interferer, increasing the number of OFDM symbols and/or the repetition factor for SRS to overcome the interference, dynamic switching/suspending of semi-persistent SRS and/or aperiodic SRS to mitigate interference to and from the interferer, and power boosting of SRS transmissions to overcome the interference. Each of the examples is described below.

Figure 3:
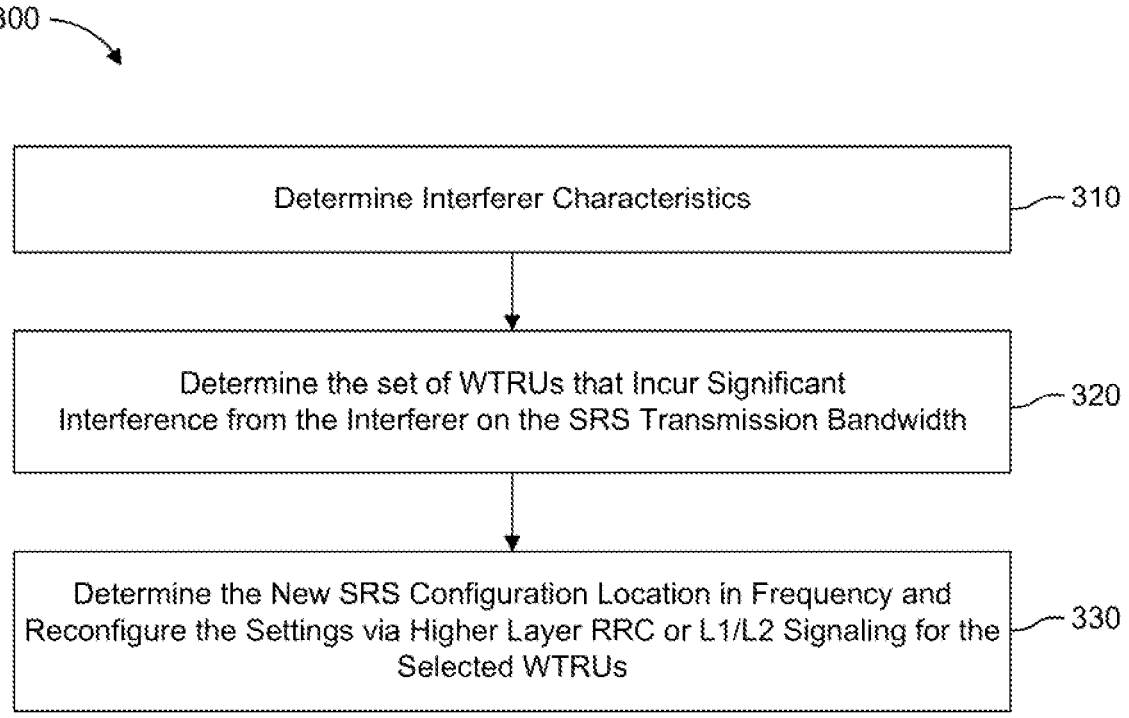
FIG. 3 illustrates a method to move WTRU SRS transmissions out of the interference band to mitigate interference to and from the interferers.

FIG. 3 illustrates a method 300 to move WTRU SRS transmissions out of the interference band to mitigate interference to and from the interferers. In the example illustrated in FIG. 3, the WTRU SRS transmissions are moved out of the interference band to mitigate interference to and from the interferers. An external node to the network may determine the interferer characteristics at 310. The interferer characteristics may include one or more of carrier frequency, bandwidth, periodicity, dwell time, Angle of Arrival (AoA), and PSD. These interferer characteristics may be determined within the wireless network by observing the measurements relevant to both WTRUs and the gNBs. The network may determine the set of WTRUs that incur significant interference from the interferer on the SRS transmission bandwidth at 320. The network may determine and reconfigure the SRS to new frequency locations via higher layer RRC or L1/L2 signaling for the selected WTRUs at 330.

At 310, the method 300 may be triggered by narrowband high-power interference level that passes the predefined threshold. For example, event triggering may be achieved by either an external node that is independently determining interference characteristics or by observing the cellular domain protocol stack measurements that are provided by WTRUs or determined by the network nodes (i.e., gNBs). The interference characteristics may include interference

```
SRS-ResourceSet ::=              SEQUENCE {
    ...,
    alpha                        Alpha
    p0                           INTEGER (−202..24)
    pathlossReferenceRS              PathlossReferenceRS-Config
    srs-PowerControlAdjustmentStates     ENUMERATED { sameAsFci2, separateClosedLoop}
    ...,
}
PathlossReferenceRS-Config ::=       CHOICE {
    ssb-Index                    SSB-Index,
    csi-RS-Index                 NZP-CSI-RS-ResourceId
}
``` level, range, and AoA. The independent node may have synchronization with the network (i.e., gNB(s)).

Upon the triggering of interference presence indication, the network is informed with the interference parameters, such as carrier location, interference bandwidth, AoA, PSD, for example. At 320, the network may compare the interference carrier and bandwidth to the existing SRS configuration frequency domain location to determine if the interference may disrupt the SRS transmission/reception. If a disruption is determined, at 330, the network may reconfigure a new SRS configuration with frequency locations not overlapped with the interference in the active UL BWP, via the RRC parameters frequencyDomainShift and frequencyDomainPosition. The network may also move the SRS frequency locations using MAC CE, dedicated DCI or group common signaling. For example, in the case of semi-persistent SRS resource sets, the network can deactivate the current SRS resource set and activate an alternative SRS resource set which contains SRS resources that are configured with frequency locations not overlapped with the interference.

Alternatively, once the interference presence is detected, the network can switch the WTRUs with SRS deemed to be impacted by RADAR to other UL BWPs that do not overlap with RADAR bandwidth, if available (if not, possibly to other UL BWPs that are less impacted by the interference).

Figure 4:
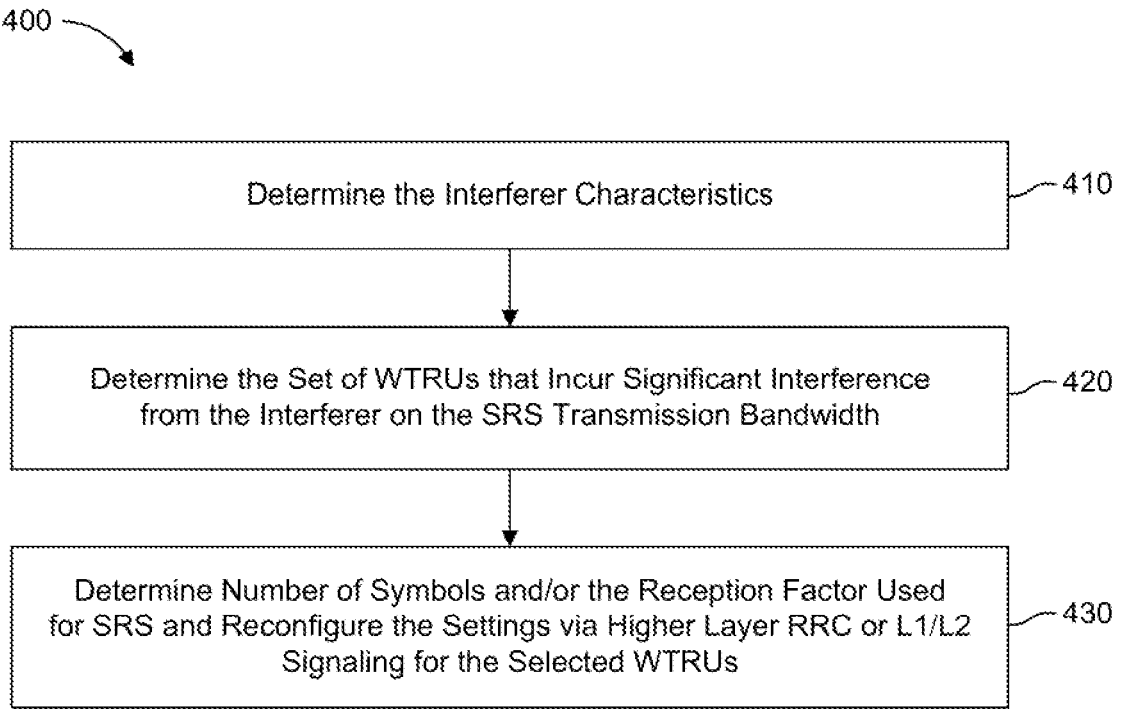
FIG. 4 illustrates a method to increase the number of OFDM symbols and/or the repetition factor for SRS to overcome interference.

FIG. 4 illustrates a method 400 to increase the number of OFDM symbols and/or the repetition factor for SRS to overcome interference. In the example illustrated in FIG. 4, the number of OFDM symbols and/or the repetition factor for SRS may be increased to overcome the interference. An external node to the network may determine the interferer characteristics at 410. The interferer characteristics may include one or more of carrier frequency, bandwidth, periodicity, dwell time, AoA, and PSD. These interferer characteristics may be determined within the wireless network by observing the measurements relevant to both WTRUs and the gNBs. The network may determine the set of WTRUs that incur significant interference from the interferer on the SRS transmission bandwidth at 420. The network may determine and reconfigure the number of symbols and/or the repetition factor used for SRS via higher layer RRC or L1/L2 signaling for the selected WTRUs at 430.

To coexist with an interferer, a gNB may increase the number of symbols and/or the repetition factor used for SRS, for WTRUs that may incur interference from the interferer using method 400. The reconfiguration of SRS may be triggered for a WTRU when the detected RADAR interference exceeds a threshold. The threshold may be preconfigured, determined dynamically, or provided by an external entity.

The gNB may use information characterizing the operation of the interference to determine the interference level. In one example, RADAR AOA information is used by the gNB to determine the spatial direction of the RADAR interference in the cell. The gNB may determine a WTRU's effective "communication" direction based on the spatial direction of an SSB or CSI-RS that is used for reception of the PUSCH.

The WTRU's location may be determined by the gNB using positioning algorithms, may be (pre)configured in the gNB via an Operations Administration and Maintenance (OAM) interface, or may be reported to the gNB by the WTRU. The gNB may determine and reconfigure the number of symbols and repetition factor for SRS for WTRUs located in areas of the cell that may incur interference exceeding a threshold or a set of thresholds.

Broadcast or dedicated higher layer RRC signaling may be used for (re-)configuration of the SRS number of symbols and repetition factor. The DCI may be used to dynamically configure the SRS number of symbols and repetition factor. The WTRU-group common signaling or a MAC-CE could be used to configure the SRS number of symbols and repetition factor. For example, in the case of semi-persistent SRS resource sets, the network can deactivate the current SRS resource set and activate an alternative SRS resource set which contains SRS resources that are configured with higher number of symbols and/or repetition factor.

In an example, DCI may be used to dynamically configure the SRS number of symbols and repetition factor.

In an example, WTRU-group common signaling could be used to configure the SRS number of symbols and repetition factor.

In an example, a MAC-CE could be used to configure the SRS number of symbols and repetition factor.

FIG. 5 illustrates a method 500 of dynamic switching/suspending of semi-persistent SRS and/or aperiodic SRS to mitigate interference to and from an interferer. In the example illustrated in FIG. 5, dynamic switching/suspending of semi-persistent SRS and/or aperiodic SRS to mitigate interference to and from an interferer is used. The network may configure and may activate WTRUs with semi-persistent SRS transmissions as needed at 510. An external node to the network may determine the interferer characteristics at 520. The interferer characteristics may include one or more of carrier frequency, bandwidth, periodicity, dwell time, AoA, and PSD. These interferer characteristics may be determined within the wireless network by observing the measurements relevant to both WTRUs and the gNBs. The network may determine the set of WTRUs that incur significant interference from the interferer on the SRS transmission bandwidth at 530. The network may deactivate the semi-persistent SRS transmissions via semi-persistent SRS MAC-CE and may request aperiodic SRS transmissions out of the interferer bandwidth via DCI (using SRS-request) for the selected WTRUs at 540.

Alternatively, the network may suspend or partially suspend impacted SRS resources or resource hops and unsuspends additional SRS resources that are not/less impacted by interferer within the semi-persistent SRS resource set via L1/L2 signaling (e.g., MAC-CE, dedicated DCI, or group common signaling) for the selected WTRUs.

A RADAR system, or other interference system, may involve some form of beam scanning, either mechanically or electronically, in order to detect and determine the distance (ranging), angle, and radial velocity of objects in its surrounding. This operational characteristic translates to a time dependent interference from the interferer to a 5th Generation (5G) system and vice versa in the context of coexistence. That is, the interference to/from the interferer is strongest when the main beam of the interferer, such as RADAR, is pointing toward at the 5G system. When the main beam of the interferer rotates away (either azimuthally or elevation-wise), the interference level is significantly lower.

To mitigate dynamic higher power radar interference, semi-persistent SRS transmission may be configured as set forth in method 500. Upon the detection of interference overlapping with the SRS resources configured for a given WTRU, a MAC-CE may be signaled to that WTRU to deactivate/suspend the semi-persist SRS resource set transmission. At the same time, gNB may schedule aperiodic SRS resource set transmission on Physical Resource Blocks (PRBs) that are not overlapping with RADAR PSD and/or on the time period that the interference does not cause significant interference to the 5G network (i.e., when the main beam of the interferer does not point toward the 5G network). When the interference falls below the threshold, gNB may resume the semi-persistent SRS resource set transmission over the originally configured time/frequency resources and stop scheduling the aperiodic SRS resource set.

Alternatively, the network may suspend some of the SRS resources within a configured semi-persist SRS resource set without deactivating the whole SRS resource set. This suspension may be achieved, for example, by including an additional SRS resource suspension bitmap at the end of the SP SRS Activation/Deactivation MAC CE: The Resource Suspension Bitmap is a field that indicates the suspension status of the SRS resources within the SP SRS Resource Set. Each bit in the bitmap represents an SRS resource as configured in the order of srs-ResourceIdList in the SRS-ResourceSet IE. A bit value of 0 indicates the corresponding SRS resource may be transmitted as per the ND bit for the AP SRS Resource Set. A bit value of 1 indicates the SRS resource is suspended even when the SRS Resource Set is activated. The length of the field is 2 bytes.

For SRS frequency hopping, a resource suspension resource block (RB) range may be defined to only suspend the SRS transmission when the bandwidth of the hopped SRS resource overlaps (or partially overlaps) with the detected interference bandwidth. A Frequency Hopping Resource Suspension RB Range field may indicate the RB range of the SRS resource suspension for frequency hopped SRS resources. The RB range is specified using the resource indication value (RIV). The length of the field is 2 bytes.

Upon the reception of the SP SRS Activation/Deactivation command for a configured semi-persistent SRS resource set with the ND bit set to 1, the WTRU may transmit the SRS resources with the corresponding suspension bits set to 0, may suspend the transmission of non-frequency-hopped SRS resources with suspension bits set to 1, and may suspend the transmission of frequency-hopped SRS resources with suspension bits set to 1 during the hop(s) when any part of the hopped SRS resource bandwidth falls in the frequency hopping resource suspension RB range. Alternatively, in the case when the hopped SRS resource bandwidth partially overlaps with the frequency hopping resource suspension RB range, it may be possible to suspend the part of hopped SRS resource that falls in the frequency hopping resource suspension RB range, and transmit the remaining part of hopped SRS resource outside the frequency hopping resource suspension RB range (possibly subject to additional constraints such as further bandwidth quantization), if the portion of the hopped SRS resource that falls in the frequency hopping resource suspension RB range relative to the hopped SRS resource bandwidth is smaller than a percentage threshold. If the portion of the hopped SRS resource that falls in the frequency hopping resource suspension RB range relative to the hopped SRS resource bandwidth is larger than or equal to the percentage threshold, the whole SRS resource may be suspended for the current hop. If the field 'Frequency Hopping Resource Suspension RB Range' is not present, the frequency-hopped SRS resources with the suspend bits set to 1 may be suspended for all hops.

In an example, a field 'Resource Suspension RB Range' (2 bytes) may be defined to determine whether an SRS resource is suspended, partially suspended, or not suspended (in this case, the fields 'Resource Suspension Bitmap' and 'Frequency Hopping Resource Suspension RB Range' are not required). A non-frequency-hopped SRS resource is suspended if any part of the SRS resource bandwidth falls in the resource suspension RB range. If the non-frequency-hopped SRS resource bandwidth is completely outside the resource suspension RB range, it is not suspended. A frequency-hopped SRS resource is suspended during the hop(s) when any part of the hopped SRS resource bandwidth falls in the resource suspension RB range.

Alternatively, when the SRS resource bandwidth (or hopped SRS bandwidth in the case of frequency hopping) partially overlaps with the resource suspension RB range, only the part of (hopped) SRS resource that falls in the resource suspension RB range is suspended, and the remaining part of (hopped) SRS resource outside the suspension RB range (possibly subject to additional constraints such as further bandwidth quantization) is still transmitted, if the portion of the (hopped) SRS resource that falls in the resource suspension RB range relative to the (hopped) SRS resource bandwidth is smaller than a percentage threshold. If the portion of the (hopped) SRS resource that falls in the resource suspension RB range relative to the (hopped) SRS resource bandwidth is larger than or equal to the afore-mentioned percentage threshold, the whole (hopped) SRS resource will be suspended.

If a WTRU does not support semi-persistent SRS resource suspension, the WTRU may ignore the SRS resource suspension bitmap and frequency hopping resource suspension RB range, or the resource suspension RB range.

Upon the detection of interference, the network can suspend or partially suspend the SRS resources or hops (in the case of frequency hopped SRS resources) within the configured SP Resource Sets that have SRS frequency regions overlapping with the interference bandwidth to mitigate the impact to and from the interference. The network may "unsuspend" other preconfigured (but initially suspended) SRS resources that do not overlap with the interference bandwidth and/or that are more resistant to interference (e.g., with increased number of SRS symbols and/or higher SRS repetition factor). The resistant to inter-ference SRS resources may provide a benefit even when the frequency region of an SRS resource does not overlap with RADAR bandwidth because the interference signal emis-sions may spill outside the interference operating band-width.

The WTRU may inform the network of its capability to support semi-persistent (SP) SRS resource suspension within SP SRS resource sets, as exemplified by the follow-ing information message in Table 5.

TABLE 5

Information Message To Inform The Network Of Its Capability To Support Semi-Persistent (SP) SRS Resource Suspension Within SP SRS Resource Sets

| Definitions for parameters | Per | M | FDD – TDD DIFF | FR1 – FR2 DIFF |
|---|---|---|---|---|
| srsSemiPersistentResourceSuspension Indicates whether the WTRU supports semi-persistent (SP) SRS resource suspension within SP SRS resource sets. | WTRU | No | No | No |

FIG. 6 illustrates a method 600 to power boost SRS transmission to overcome interference. In the example illus-trated in FIG. 6, SRS transmissions may be power boosted to overcome interference. In such a scenario, the network may configure a set of SRS target received power P0 via broadcast or dedicated higher layer RRC signaling at 610. An external node to the network may determine the interferer characteristics at 620. The interferer characteristics may include one or more of carrier frequency, bandwidth, periodicity, dwell time, AoA, and PSD. These interferer characteristics may be determined within the wireless network by observing the measurements relevant to both WTRUs and the gNBs. The network may determine the set of WTRUs that incur significant interference from the interferer on the SRS transmission bandwidth at 630. The network may select the target received power P0 used for SRS and may semi-persistently activate the P0 value via L1/L2 signaling (e.g., MAC CE, dedicated DCI, or group common signaling) at 640.

SRS power boosting may be triggered for a WTRU when the interference exceeds a threshold. The threshold may be preconfigured, determined dynamically or provided by an external entity. Different thresholds may be defined and selected by the gNB. The gNB may use information characterizing the operation of the interferer to determine the interference level. In one example, RADAR AOA information is used by the gNB to determine the spatial direction of the RADAR interference in the cell. The gNB may determine a WTRU's effective "communication" direction based on the spatial direction of an SSB or CSI-RS that is used for reception of the PUSCH/SRS. Alternatively, the WTRU's location may be determined by the gNB using positioning algorithms, may be (pre)configured in the gNB via an OAM interface, or may be reported to the gNB by the WTRU. The gNB may use power boosting for WTRUs located in areas of the cell that would incur interference exceeding a threshold.

Power boosting may be explicitly performed by employing a target received power P0 value higher than the nominal P0 value for outer loop power control via RRC signaling. Alternatively, the value of P0 may be updated via MAC CE or dynamic scheduling. In either case, the SINR target for the inner loop power control should be increased correspondingly.

As an example, a WTRU may be configured with up to four values of the open-loop power control target received power parameter P0 for SP SRS using high layer signaling. One of the P0 values corresponds to the default transmission power, while (up to three) additional P0 values (as illustrated by p0-SP-List below) can be configured. An example is provided below.

The value between 1 to 3 indicates which of the p0 values configured in the p0-SP-List should applied The length of the field is 2 bits.

Alternatively, the network may indicate the P0 value to be applied per SRS resource within the SRS resource set. A 'Resource P0 Bitmap' may be used to indicate the power control P0 value for each SRS resource within the SP SRS Resource Set. For example, every two bits in the bitmap represents the P0 value of an SRS resource as configured in the order of srs-ResourceIdList in the SRS-ResourceSet IE. For each SRS resource, a value of 0 indicates the parameter p0 in the SRS-ResourceSet IE should be applied. The value between 1 to 3 indicates which of the p0 values configured in the p0-SP-List should be applied.

The WTRU may inform the network of its capability to support semi-persistent SRS power control P0 update, as exemplified by the following information message in Table 6.

TABLE 6

| INFORMATION MESSAGE TO Inform The Network Of Its Capability To Support Semi-Persistent (SP) SRS Power Control P0 Update | | | | |
| --- | --- | --- | --- | --- |
| Definitions for parameters | Per | M | FDD – TDD DIFF | FR1 – FR2 DIFF |
| srsSemiPersistentP0Update Indicates whether the WTRU supports semi-persistent SRS P0 update | WTRU | No | No | No |

In an example, WTRU-group common signaling may be used to select the target received power p0 for SRS for a group of WTRUs.

In an example, a dedicated DCI signaling may be used to select the target received power p0 for SRS.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples

```
SRS-ResourceSet ::=              SEQUENCE {
  srs-ResourceSetId                SRS-ResourceSetId,
  srs-ResourceIdList               SEQUENCE (SIZE(1..maxNrofSRS-ResourcesPerSet)) OF SRS-ResourceId
  ...
  alpha                          Alpha
  p0                             INTEGER (–202..24)
    p0-SP-List                       SEQUENCE (SIZE (1..maxNrofP0-SP-SRS)) OF P0-SP-SRS
  pathlossReferenceRS              PathlossReferenceRS-Config
  srs-PowerControlAdjustmentStates   ENUMERATED { sameAsFci2, separateClosedLoop}
  ...;
}
P0-SP-SRS ::=                    INTEGER (–202..24)
maxNrofP0-SP-SRS                   INTEGER ::= 3           -- Maximum number of P0 SP SRS
```

60

The network may redefine the two consecutive R15/R16 Reserved bits (before the C bit) in the SP SRS Activation/Deactivation MAC CE to be P0 bits to facilitate flexible and efficient change of the SRS power control settings. A P0 field may be used to indicate the SRS P0 value to be applied for the SP SRS Resource Set. A value of 0 indicates the parameter p0 in the SRS-ResourceSet IE should applied.

of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed in a network node for providing semi-persistent (SP) sounding reference signals (SRS) resource modification, the method comprising:

determining a set of characteristics of an interferer;

determining a set of wireless transmit and receive units (WTRUs) that incur interference from the interferer on a sounding reference signal (SRS) transmission bandwidth, the determination based on the determined set of characteristics of the interferer; and transmitting an SRS suspension bitmap and frequency hopping resource suspension range in a semi-persistent signaling.

2. The method of claim 1 wherein the interferer is radar.

3. The method of claim 1 wherein the SRS resource suspension bitmap is configured to indicate a suspension status of SRS resources.

4. The method of claim 3 wherein at least one bit in the SRS resource suspension bitmap represents an SRS resource from an SRS resource set.

5. The method of claim 3 wherein a value in the SRS resource suspension bitmap is configured to correspond to the SRS resource and indicates if a resource is to be suspended or transmitted.

6. The method of claim 5 wherein a value of zero indicates transmission.

7. The method of claim 5 wherein a value of one indicates suspension.

8. The method of claim 1 wherein the frequency hopping resource suspension range is configured to indicate a Resource Block (RB) range of the SRS resource suspension for frequency hopped SRS resources.

9. The method of claim 8 wherein the RB range is specified using a resource indication value (RIV).

10. A method performed in a wireless transmit and receive unit (WTRU) for providing semi-persistent (SP) sounding reference signals (SRS) resource modification responsive to at least one interferer, the method comprising:

receiving an activation/deactivation command of a configured semi-persistent sounding reference signal (SRS) resource set, the activation/deactivation command including a resource suspension bitmap and a frequency hopping resource suspension range;

transmitting the SRS resources based on the resource suspension bitmap;

suspending a transmission of non-frequency hopped SRS resources indicated as suspend in the resource suspension bitmap; and suspending a transmission of frequency-hopped SRS resources with suspension bits set to be suspended during the hop when at least a portion of an SRS resource bandwidth falls in the frequency hopping resource suspension range.

11. The method of claim 10 wherein an activation/deactivation field of the received semi-persistent SRS activation/deactivation command is set to 1.

12. The method of claim 10 wherein suspension bits set to be transmitted are zero.

13. The method of claim 10 wherein suspension bits set to be suspended are one.

14. The method of claim 10 wherein the at least one interferer comprises radar.

15. The method of claim 10 wherein the resource suspension bitmap is configured to indicate a suspension status of SRS resources.

16. The method of claim 10 wherein the resource suspension bitmap includes at least one bit that represents an SRS resource from an SRS resource set.

17. The method of claim 16 wherein a value in the SRS resource suspension bitmap is configured to correspond to the SRS resource and indicates if the resource is to be suspended or transmitted.

18. The method of claim 10 further comprising a frequency hopping resource suspension range configured to indicate a Resource Block (RB) range of the SRS resource suspension for frequency-hopped SRS resources to identify if at least a portion of an SRS resource bandwidth of a hop falls in the frequency hopping resource suspension range.

19. The method of claim 18 wherein the RB range is specified using a resource indication value (RIV).

* * * * *